United States Patent

Betsch et al.

[11] Patent Number: 6,046,520
[45] Date of Patent: Apr. 4, 2000

[54] LIQUID COOLED GENERATOR

[75] Inventors: Jochen Betsch, Waiblingen; Gerhard Doll, Esslingen; Roland Doll, Weilheim, all of Germany

[73] Assignee: DaimlerChrysler AG, Stuttgart, Germany

[21] Appl. No.: 09/263,321
[22] Filed: Mar. 5, 1999
[51] Int. Cl.$^7$ .................................................. H02K 9/00
[52] U.S. Cl. .................. 310/54; 310/52; 310/58
[58] Field of Search .................. 310/54, 60 A, 310/52, 58

[56] References Cited

U.S. PATENT DOCUMENTS

| | | | |
|---|---|---|---|
| 2,383,019 | 10/1945 | Sigmund et al. | 310/86 |
| 4,980,588 | 12/1990 | Ogawa | 310/68 D |
| 5,623,175 | 4/1997 | Ronning et al. | 310/54 |
| 5,664,916 | 9/1997 | Link et al. | 409/135 |

FOREIGN PATENT DOCUMENTS

| | | |
|---|---|---|
| 41 04 740 | 8/1991 | Germany . |
| 44 44 956 | 5/1995 | Germany . |
| 196 30 658 | 2/1997 | Germany . |

*Primary Examiner*—Nestor Ramirez
*Assistant Examiner*—Guillermo Perez
*Attorney, Agent, or Firm*—Klaus J. Bach

[57] ABSTRACT

In a liquid-cooled generator including a generator structure disposed in a housing in spaced relationship therefrom so as to form a narrow space between the generator structure and the housing wherein the housing has inlet and exit opening for conducting a coolant through the annular space, a restriction is disposed in the annular space between the inlet and the exit openings and the inlet opening extends essentially tangentially to the inner wall of the generator housing so as to establish in the annular space an essentially circumferential coolant flow.

6 Claims, 2 Drawing Sheets

LIQUID COOLED GENERATOR

The invention relates to a liquid-cooled generator or alternator, particularly for a motor vehicle, which generator is disposed in a housing having at the inside thereof an annular space and inlet and exit openings for a coolant. The coolant flows from the inlet opening circumferentially through the annular space and exits through the exit opening.

Such a generator is shown for example in DE 44 44 956 A1 and also in DE 41 04 740 A1. These generators, however, consume a relatively large amount of coolant and, at the same time, have a relatively low cooling efficiency and require therefore a relatively large amount of pumping energy.

In both cases, the coolant entering through the inlet opening impinges directly on a wall or respectively, on the generator which results in impingement losses in the annular space and which causes uneven cooling. Furthermore, the housings have complicated shapes requiring also complicated casting tools.

It is the object of the present invention to provide a liquid cooled generator, which has flow passages with low flow losses. In addition, a relatively small amount of coolant should be consumed with high cooling efficiency.

SUMMARY OF THE INVENTION

In a liquid-cooled generator including a generator structure disposed including a housing disposed in a shell in spaced relationship therefrom so as to form a narrow space between the generator structure and the shell, wherein the shell has inlet and exit openings for conducting a coolant through the annular space, a restriction is disposed in the annular space between the inlet and the exit openings and the inlet opening extends essentially tangentially to the inner wall of the shell so as to establish in the annular space an essentially circumferential coolant flow.

With the tangential arrangement of the inlet opening, the coolant entering the annular space generates a flow in circumferential direction around the generator. At the same time, impingement losses and the resulting pressure losses are avoided, which results in an efficient coolant flow and uniform cooling.

With a restriction in the annular space between the inlet opening and the outlet opening, a short circuit flow against the normal flow direction between the inlet and outlet opening is prevented. With the arrangement according to the invention, the design is simple and manufacturing costs are relatively low and only little generator vibrations are transmitted to the housing.

Advantageous embodiments of the invention will be described below in greater detail on the basis of the accompanying drawings.

BRIEF DESCRIPTION

FIG. 1 is a cross-sectional view of the generator according to the invention, and FIG. 2 is a cross-sectional view taken along line I—I of FIG. 1.

DESCRIPTION OF PREFERRED EMBODIMENTS

Figure 1:
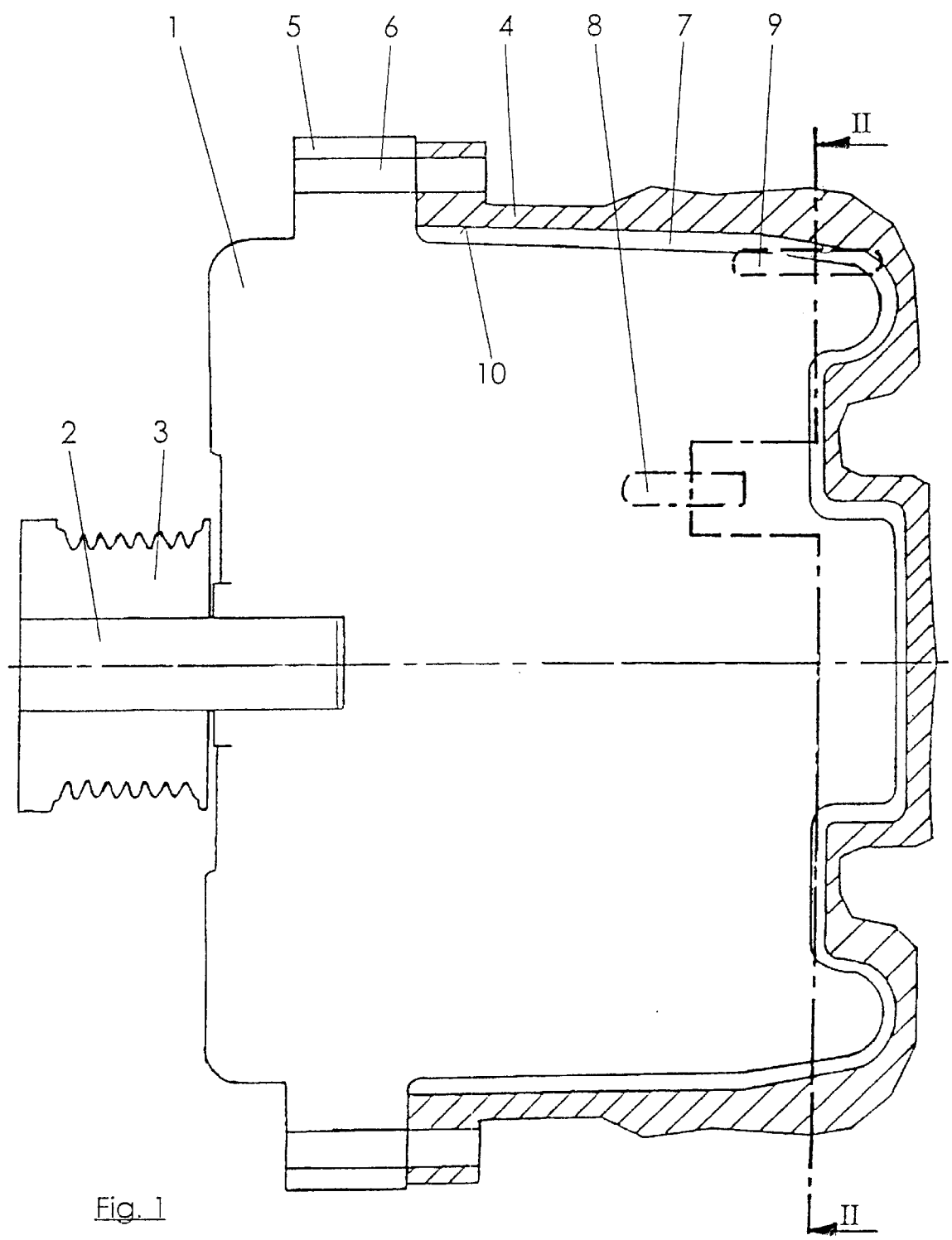

FIG. 1 shows a generator or alternator 1, which is fully encapsulated. The generator as such is of conventional design including a housing enclosing the generator components The various components of the generator such as the rotor or stator are therefore not shown. These components are well known. At one end, the generator 1 includes an input shaft 2 on which a drive pulley 3 is disposed. The generator 1 is intended for use in a motor vehicle which is not shown. The generator may also be called an alternator as it produces alternating current, which is then rectified.

The generator 1 is disposed in a pot-like shell 4, which is adapted to the shape of the generator 1. At the end of the input shaft 2, the generator is provided with a connecting flange 5 to which the shell 4 mounted by way of mounting bolts (not shown), which extend through bores 6.

Between the shell 4 and the generator 1, there is an annular space 7, which, in the cross-sectional area shown in FIG. 1, has an essentially uniform width of about 2 to 3 mm. As a result, except for the area around the connecting flange 5, there is no direct contact between the generator 1 and the shell 4 so that vibrations are transmitted from the generator to the shell 4 only to a very small degree. The annular space 7 receives cooling liquid, which is admitted by way of an inlet opening 8 and is discharged by way of an exit opening 9. The annular space 7 extends circumferentially around the generator 1 and also extends over the end face of the generator opposite the input shaft 2. The generator 1 is cooled by the coolant flowing through the annular space 7. The coolant is withdrawn from the cooling circuit of the internal combustion engine of a motor vehicle in which the generator 1 is used.

Figure 2:
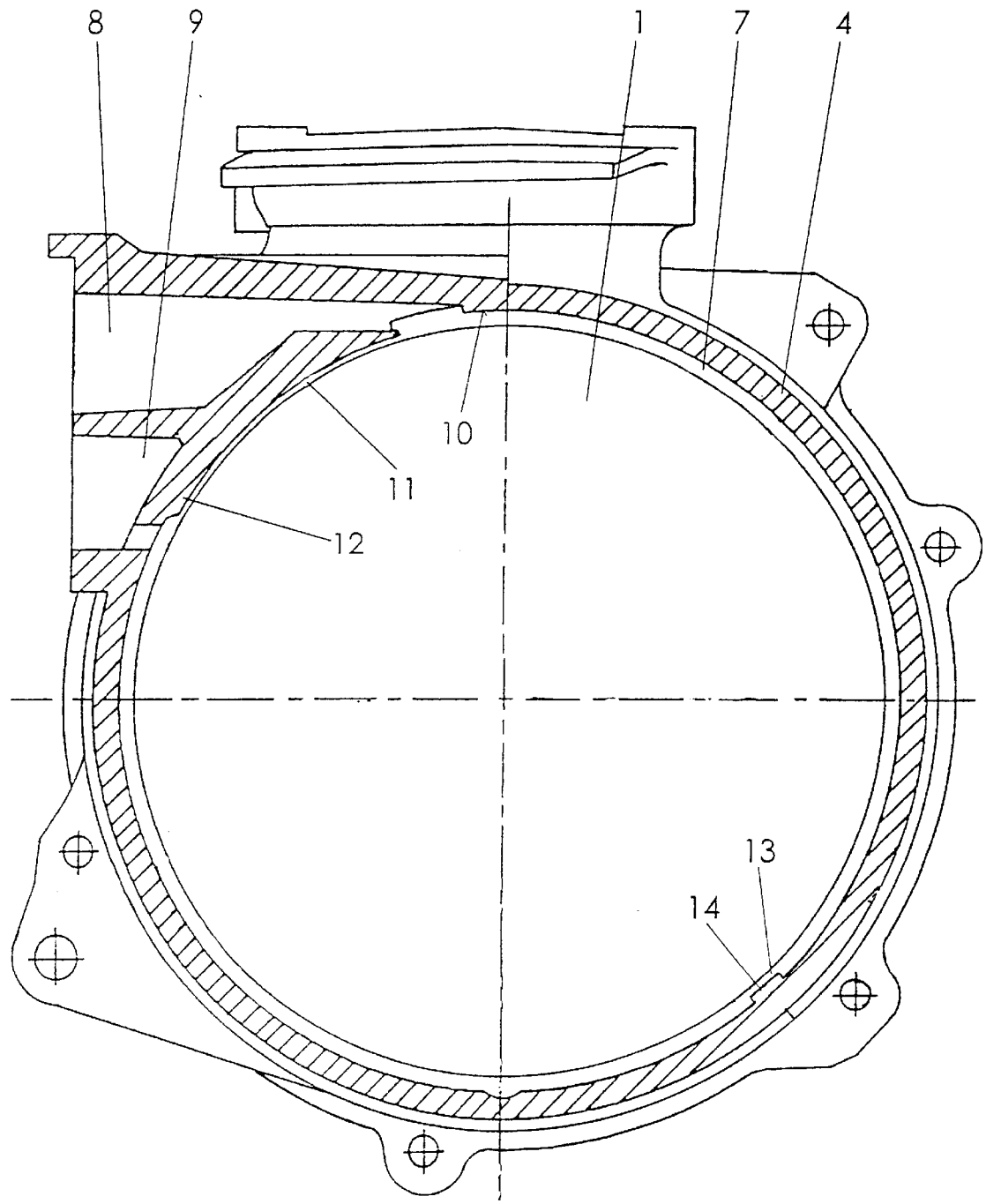

As shown in FIG. 2, the inlet opening 8 is arranged at the highest point of the annular space 7 and is so oriented that the coolant enters the annular space 7 tangentially. With the arrangement of the inlet opening 8 at the top, gas removal from the annular space 7 is facilitated.

The coolant enters the annular space through the inlet 8 at a relatively small angle with respect to the inner wall 10 of the shell 4, whereby impingement flow is negligible and pressure losses are avoided. In flow direction, the exit opening 9 is displaced from the inlet opening 8 by an angle of more than 270°, preferably 300°. Consequently the coolant flows through the annular space 7 around the generator for a larger generator angular distance, which provides for good cooling results.

In order to prevent short circuit currents, that is a flow from the entrance opening 8 directly to the exit opening 9 or to keep it at a minimum, the annular space 7 includes between the inlet opening 8 and the exit opening 9 a restriction 11 of about 1 mm. The restriction is formed by a projection 12 on the shell 4. The projection 12 may be welded to the inner wall 10 of the shell 4 or it may be screwed thereto. However, it is shown in FIG. 2 as being formed integrally with the shell 4.

The restriction still permits the flow of some coolant to provide for cooling of the area between the inlet and exit openings, but the flow is greatly restricted so that an essentially homogenous circumferential flow is established in the annular space 7.

Opposite the inlet opening 8 and the exit opening 9 that is angularly displaced by about 180°, there is provided another restriction 13, which is also formed by a projection 14 of the shell 4. Alternatively, the two restrictions 11 and 13 may be provided by projections projecting from the generator 1.

With the pressure drop generated in this manner, the coolant in the annular space 7 also flows along the planar side of the generator opposite the input shaft 2. In the area of the planar side, the space 7 does not have a uniform width for functional reasons.

In FIG. 1, the flow of the coolant in the area of the narrow space 7 at the side opposite the input shaft can be seen. Since the generator has a bearing in this area, it is important that this area is well cooled.

The coolant flows from the inlet opening 8 in the direction toward the restriction 13 and, since a pressure drop is generated, the coolant is partially diverted axially toward the planar end surface. Another part of the coolant flows through the restriction and on to the exit opening 9.

As also apparent from FIG. 1, the exit opening 9 is arranged axially displaced with respect to the inlet opening 8, which results in further distribution of the coolant within the narrow space 7.

A calibration nozzle may be disposed in the inlet opening in a manner not shown, the nozzle being sized to control the total amount of coolant flowing through the narrow space 7.

The shell 4 is a casting which can be formed without core by injection molding using simple inexpensive unidirectionally operating tools.

What is claimed is:

1. A liquid-cooled generator comprising an encapsulated generator structure including a housing having a face end with an input shaft and a connecting flange extending around said generator housing adjacent said face end thereof, a pot-like shell sealingly mounted to said flange and having an inner wall adapted to the shape of said generator housing and fully surrounding said generator housing in spaced relationship except for said face end thereof so as to form between said generator housing and said shell an at least partially annular narrow space, said shell having coolant inlet and exit openings, said inlet opening extending essentially tangentially to the inner wall of said shell for admitting a coolant to said at least partially annular space so as to establish in said annular an essentially circumferential coolant flow around said generator housing, and a restriction disposed in said annular space between said inlet and exit openings to prevent coolant from flowing from said inlet opening directly to said exit opening.

2. A liquid-cooled generator according to claim 1, wherein said exit opening is displaced angularly from said inlet opening in the flow direction of said coolant through said annular space by an angle of at least 270°.

3. A liquid-cooled generator according to claim 1, wherein said exit opening is displaced from said inlet opening in axial direction of said generator housing.

4. A liquid-cooled generator according to claim 1, wherein, in the area of said annular space essentially opposite said inlet and exit openings, a flow restriction is provided which restricts the circumferential coolant flow.

5. A liquid-cooled generator according to claim 1, wherein said restriction between said inlet and exit openings is formed by a projection extending essentially over the full axial length of said housing and projecting from the inner wall of said housing toward said generator structure.

6. A liquid-cooled generator according to claim 4, wherein said restriction in the area of said annular space opposite said inlet and exit openings is formed by a projection extending over the full axial length of said housing and projecting from the inner wall of the shell toward said generator housing to a predetermined distance therefrom.

* * * * *